(12) United States Patent
Kenney et al.

(10) Patent No.: US 11,903,007 B2
(45) Date of Patent: Feb. 13, 2024

(54) FREQUENCY SELECTION IN A FREQUENCY DOMAIN DUPLEXING NETWORK

(71) Applicant: L3Harris Technologies, Inc., Melbourne, FL (US)

(72) Inventors: Brent A. Kenney, Bountiful, UT (US); Jeffrey B. Bench, Lehi, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 400 days.

(21) Appl. No.: 17/356,306

(22) Filed: Jun. 23, 2021

(65) Prior Publication Data

US 2022/0417934 A1 Dec. 29, 2022

(51) Int. Cl.
*H04W 72/08* (2009.01)
*H04L 5/14* (2006.01)
*H04W 24/10* (2009.01)
*H04W 72/541* (2023.01)

(52) U.S. Cl.
CPC ............. *H04W 72/541* (2023.01); *H04L 5/14* (2013.01); *H04W 24/10* (2013.01)

(58) Field of Classification Search
CPC ...... H04W 72/541; H04W 24/10; H04L 5/14; H04L 27/0006; H04L 5/143; Y02D 30/70
See application file for complete search history.

(56) References Cited

U.S. PATENT DOCUMENTS

| 8,792,466 | B2 | 7/2014 | Kim et al. |
| 10,181,972 | B1 | 1/2019 | Giallorenzi et al. |

| 2013/0150055 | A1* | 6/2013 | Laroia | H04W 36/20 |
| | | | | 455/443 |
| 2015/0271832 | A1 | 9/2015 | Lan | |
| 2015/0349884 | A1* | 12/2015 | Bialic | H04B 10/116 |
| | | | | 398/118 |

FOREIGN PATENT DOCUMENTS

WO 2010/011796 A2 1/2010

OTHER PUBLICATIONS

Chowdbury's Cognitive Wireless Mesh Networks with Dynamic Spectrum Access, IEEE, vol. 26 No. 1, pp. 168-181, Jan. 2008 (14 pages).
European Search Report received for EP Patent Application No. 22175338.7, dated Nov. 29, 2022, 5 pages.

* cited by examiner

*Primary Examiner* — Walli Z Butt
*Assistant Examiner* — Thad N Defauw
(74) *Attorney, Agent, or Firm* — Workman Nydegger (57) ABSTRACT

A transmitter in a frequency domain duplexing (FDD) network system is configured to receive spectral information from neighbor receiver nodes. For each of the neighbor receiver nodes, the transmitter computes an SNR at each of the plurality of frequencies, forming an SNR curve. For each of the transmit frequencies, the transmitter identifies minimum SNR values among the SNR values on the SNR curves. The minimum SNR values form a composite minimum curve. Based on the composite minimum curve, the transmitter determines whether an SNR of a current transmit frequency is above (1) a first threshold associated with an operating SNR, or (2) a second threshold associated with a maximum of the composite minimum curve. Based on the determination, the transmitter determines whether a new transmit frequency is selected to replace the current transmit frequency.

20 Claims, 8 Drawing Sheets

Identify a subset of frequencies on the composite minimum curve, each of which corresponds to a minimum Eb/N0 ratio that is greater than both of the first and second thresholds for each of the neighbor nodes 710

↓

Randomly select a first operating frequency f1 from the subset of frequencies that is at least a minimum spacing from a highest frequency in the subset of frequencies 720

↓

Randomly select a second operating frequency f2 from the subset of frequencies that is at least a minimum spacing from the first frequency f1 730

FREQUENCY SELECTION IN A FREQUENCY DOMAIN DUPLEXING NETWORK

BACKGROUND

In a code division multi-access (CDMA) mobile ad hoc network (MANET), receivers perform spectral sensing of received signals from a transmitter and relay the relevant spectral information and jammer characterization data to the transmitter side of a link to aid in frequency selection by the transmitter. Different methods may be implemented by the transmitter to select a transmit frequency. For example, many existing technologies rely on interference measurements on pre-defined channel locations to select transmit frequencies. Some systems may perform frequency selection activities to achieve both power efficient (PE) and anti jam (AJ) objectives. That is, it may be desirable to prevent adversaries from detecting and/or jamming signals. Note that with respect to jamming, jamming may be intentional or simply caused by unintentional interference, such as by nearby radio or cell towers.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The principles described herein are related to a frequency domain duplexing (FDD) network system, a transmitter in an FDD network system, and/or a method for frequency selection in an FDD network system.

The FDD network system includes a transmitter configured to receive spectral information from one or more neighbor receiver nodes. The spectral information includes a power at each of a plurality of transmit frequencies within a current band of operation. For each of the one or more receiver nodes, the transmitter computes an energy per bit ($E_b$) to noise power spectral density ($N_0$) ratio (also referred to as signal-to-noise ratio or SNR) at each of the plurality of frequencies within the band of operation, forming an SNR curve vs. frequency. In some embodiments, the SNR curve is normalized to the maximum transmit power and the current desired rate of the transmitter.

For each of the plurality of frequencies, the transmitter identifies a minimum SNR among the $E_b/N_0$ ratios on the SNR curves of the one or more neighbor receiver nodes, forming a composite minimum curve. Based on the composite minimum curve, it is then determined whether an SNR of the current transmit frequency is above (1) a first threshold associated with a predetermined operating SNR, or (2) a second threshold associated with a maximum of the composite minimum curve. In some embodiments, the first threshold is the predetermined operating SNR, and the second threshold is a predetermined amount (i.e., β dB) below the maximum of the composite minimum curve.

Based on the determination, the transmitter determines whether a new transmit frequency is selected to replace the current transmit frequency.

In some embodiments, when the SNR of the current transmit frequency is above both the first threshold and the second threshold, no frequency change is commanded. In some embodiments, when no transmit frequency within the band of operation is above both the first threshold and the second threshold, the transmitter commands a band swap, swapping to a different band of operation.

In some embodiments, when the SNR of the current transmit frequency is not above both the first threshold and the second threshold, the transmitter identifies a subset of frequencies within the band of operation on the composite minimum curve, each of which has a minimum SNR greater than both of the first threshold and the second threshold. A new transmit frequency is selected with the subset of frequencies.

In some embodiments, when more than one new transmit frequency needs to be selected, the transmitter randomly selects a first frequency f1 from the subset of frequencies that is at least a minimum spacing away from a highest frequency in the subset of frequencies. The transmitter then randomly selects a second frequency f2 from the subset of frequencies that is at least a minimum spacing away from the first frequency f1.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments that are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

The principles described herein are related to a frequency domain duplexing (FDD) network system, a transmitter in a frequency domain duplexing (FDD) network system, and/or a method for frequency selection in an FDD network system. A MANET is a collection of two or more wireless devices having the capability to communicate with each other without the aid of any centralized administrator.

Figure 1:
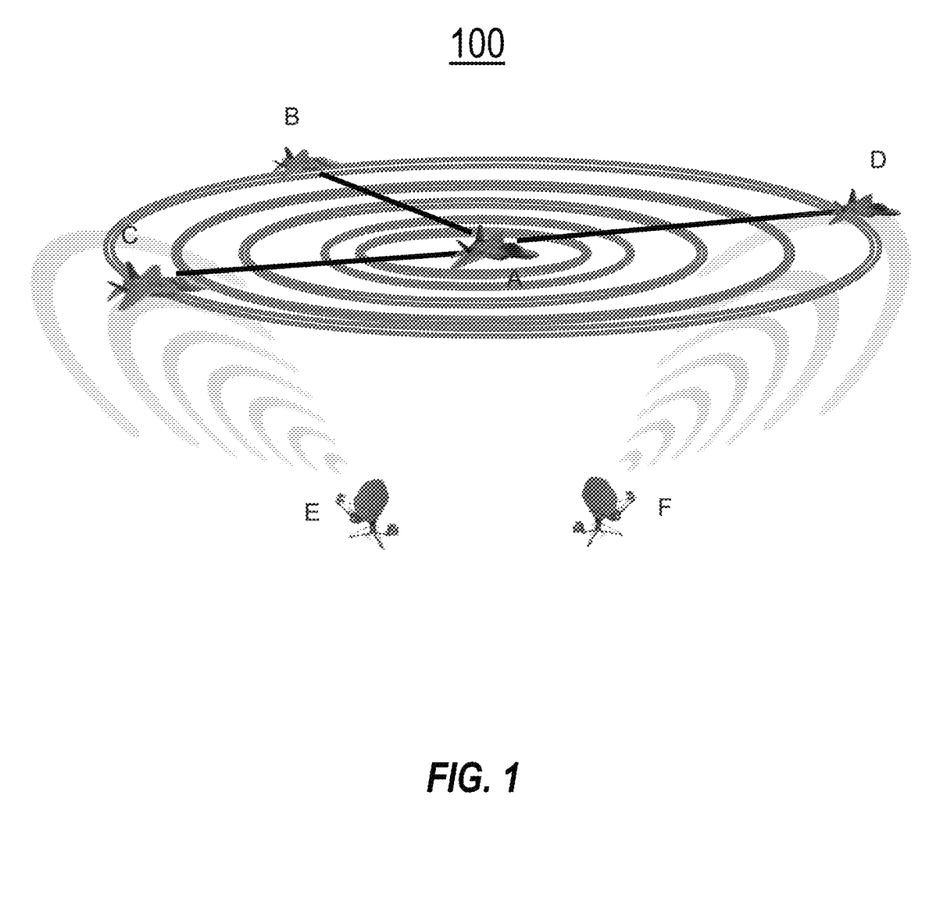
FIG. 1 illustrates an example of a frequency domain duplexing (FDD) network system, including a plurality of nodes A, B, C, D, E, and F, wherein node A is a transmitter configured to transmit data to receiver nodes B, C, and D.

FIG. 1 illustrates an example of an FDD network system 100, including a plurality of nodes A, B, C, D, E, and F, each of which may be mobile or stationary. Some of these nodes A-F may be jammers (e.g., nodes E and F) configured to generate jamming signals to interfere with communications among other nodes, and some of these nodes A-F may be trying to communicate with each other while the jammers are generating jamming signals. The nodes A-F typically include transmitters configured to transmit communication data to one or more neighbor receiver nodes wirelessly and receivers configured to receive communication data from one or more neighbor receiver nodes. For example, each of nodes A-F may include a transmitter (configured to transmit data to one or more neighbor nodes) and a receiver (configured to receive data from one or more neighbor nodes). For simplicity, in the example illustrated in FIG. 1, node A is shown as a transmitter node, while nodes B, C, and D are shown as receiver nodes, although communication will generally be bidirectional.

The FDD network system 100 implements a spread spectrum multiple access scheme in which a transmitter spreads the information signal in a wide frequency band by using a spreading code. A receiver uses the same code to retrieve the received signal. This approach provides multiple access by allowing simultaneous transmission of data by different nodes.

Additionally, in the FDD network system 100, when a receiver receives communication data from a transmitter, the receiver performs spectral sensing and relays the relevant spectral information, potentially including jammer characterization data, to the transmitter. The transmitter is configured to process the received data to estimate a signal-to-noise ratio (SNR), typically expressed by the ratio $E_b/N_0$ where $E_b$ is the energy per bit and $N_0$ is the noise power spectral density, at each potential center frequency across the band of operation. In some embodiments, the SNR may assume that the local node is transmitting at its maximum allowed power. In some embodiments, the SNR is computed based on the desired rate, regardless of whether that rate is currently being achieved.

As illustrated in FIG. 1, the node A includes a transmitter configured to transmit data to each of the neighbor receiver nodes B, C, and D. When each of the neighbor receiver nodes B, C, and D receives the communication from node A, they each perform spectral sensing and relay the relevant spectral information to the transmitter at node A. The sensed spectral information might be represented by a power-frequency curve.

Figure 2A:
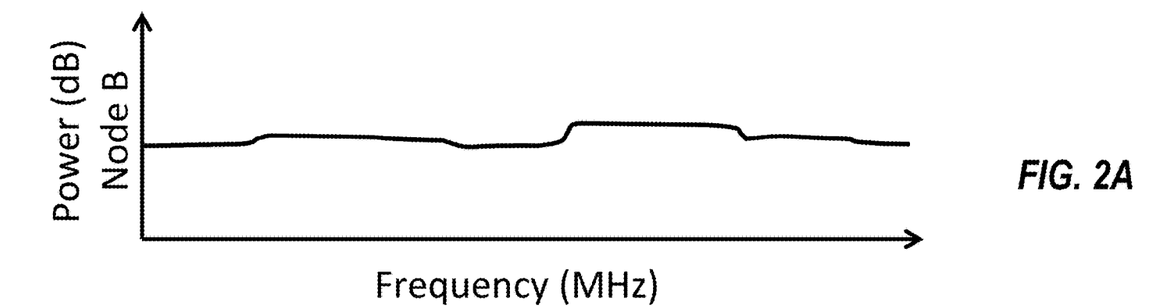
FIG. 2A illustrates a curve representing spectral information sensed by receiver node B of FIG. 1.
Figure 2B:
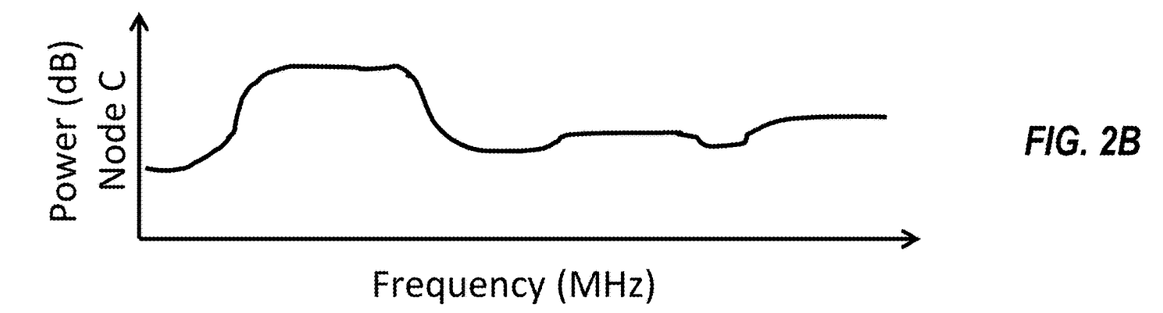
FIG. 2B illustrates a curve representing spectral information sensed by receiver node C of FIG. 1.
Figure 2C:
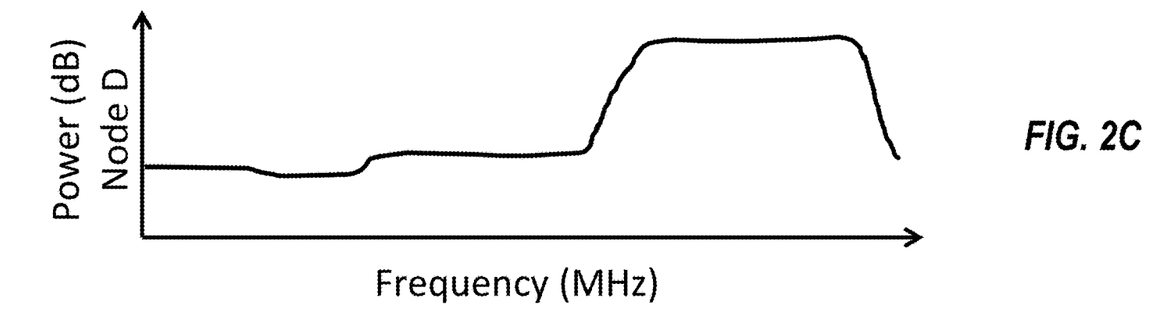
FIG. 2C illustrates a curve representing spectral information sensed by receiver node D of FIG. 1.

FIGS. 2A-2C illustrate three power-frequency curves representing spectral information sensed by each of the receiver nodes B, C, and D, respectively. In particular, FIG. 2A illustrates spectral information sensed by node B, FIG. 2B illustrates spectral information sensed by node C, and FIG. 2C illustrates spectral information sensed by node D. In each of FIGS. 2A-2C, the x-axis represents a frequency spectrum across the band of operation, and the y-axis represents a power of the sensed signal, including the signal transmitted by node A and any noise or jamming signals.

The transmitter at node A receives the spectral information from each of nodes B, C, and D, and processes the received information, as well as using information about the power, rate, and/or measured $E_b/N_0$ at which the original information was transmitted SNR at each potential transmitter (node A) center frequency across the band of operation. For each neighbor receiver node B, C, and D, the estimated SNR at each potential transmitter center frequency across the band of operation can be represented by an SNR curve.

Figure 3A:
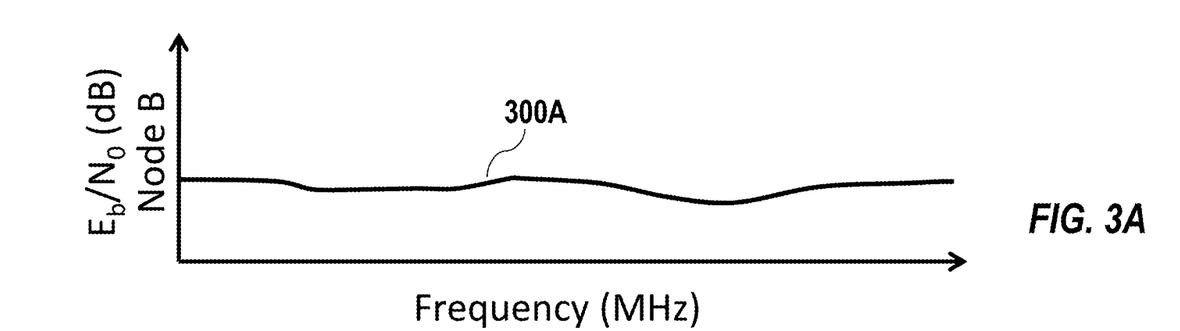
FIG. 3A illustrates an SNR curve generated based on the spectral information received from receiver node B.
Figure 3B:
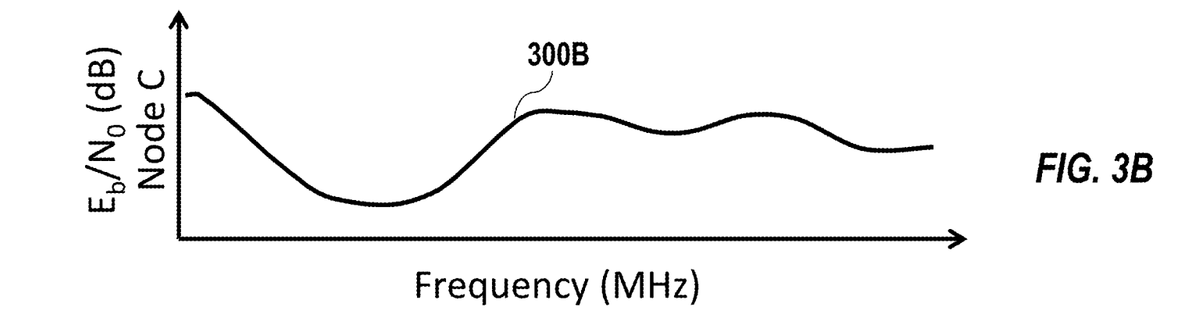
FIG. 3B illustrates an SNR curve generated based on the spectral information received from receiver node C.
Figure 3C:
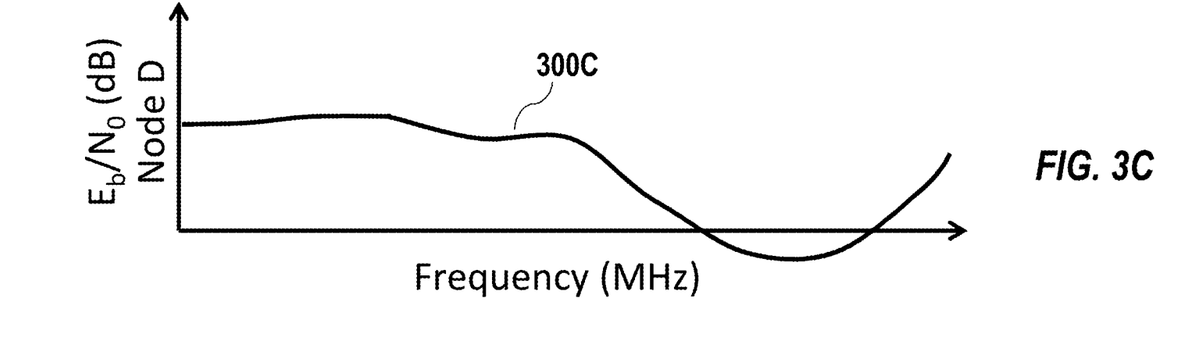
FIG. 3C illustrates an SNR curve generated based on the spectral information received from receiver node D.

FIGS. 3A-3C illustrate three SNR curves representing the processed SNRs based on power, rate, measured $E_b/N_0$, and spectral information received from nodes B, C, and D, respectively. In particular, FIG. 3A illustrates an SNR curve 300A generated based on the spectral information received from node B (shown in FIG. 2A) as well its power, rate, and measured $E_b/N_0$, FIG. 3B illustrates an SNR curve 300B generated based on the spectral information received from node C (i.e., shown FIG. 2B) as well its power, rate, and measured $E_b/N_0$, and FIG. 3C illustrates an SNR curve 300C generated based on the spectral information received from node C (i.e., shown FIG. 2C) as well its power, rate, and measured $E_b/N_0$. In FIGS. 3A-3C, the x-axis represents the frequency spectrum across the band of operation, and the y-axis represents an SNR. In some embodiments, the curves are normalized to the maximum transmit power and the currently desired rate of the transmitter at node A. In some embodiments, normalizing the curves includes changing the feedback from each neighbor to a same power and a same rate setting at the transmitter, specifically to the maximum transmit power and the currently desired rate.

Figure 4A:
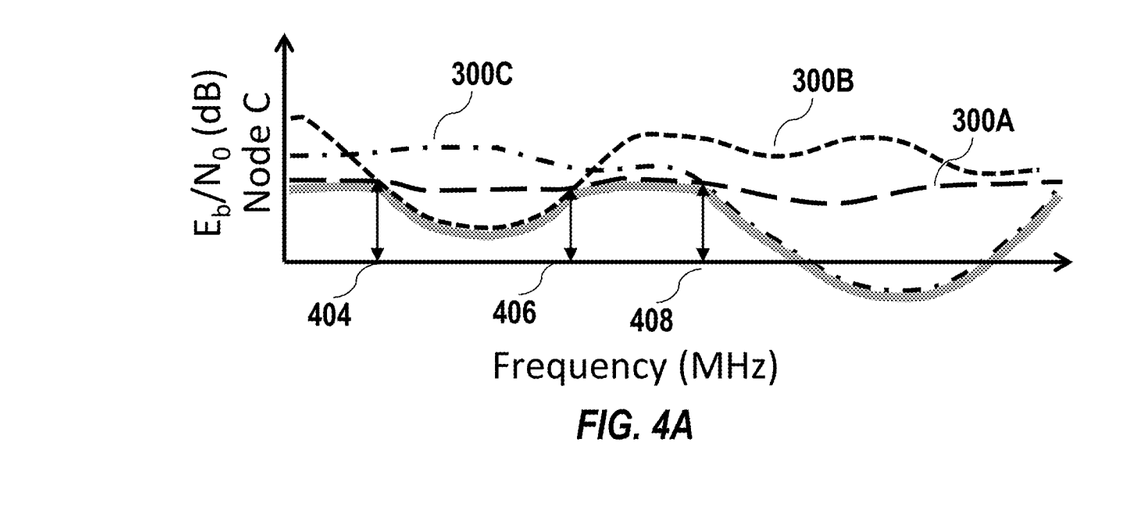
FIG. 4A illustrates an example of a process of generating a composite minimum curve based on SNR curves of FIGS. 3A-3C.

Based on the curves of each neighbor receiver nodes B, C, and D, a composite minimum curve is created by taking a minimum of each curve at each frequency. FIG. 4A illustrates an example of a process of generating a composite minimum curve based on SNR curves 300A, 300B, and 300C of FIGS. 3A-3C. In FIG. 4A, the normalized curves 300A, 300B, 300C (shown in FIGS. 3A, 3B, and 3C) are drawn on a same chart, in which the x-axis represents the frequency spectrum across the band of operation, and the y-axis represents the SNRs at each frequency in the frequency spectrum. The composite minimum curve takes a minimum of each curve at each frequency. For example, before frequency point 404, the minimum of the three curves 300A, 300B, 300C is a corresponding portion of the curve 300A. Between the frequency points 404 and 406, the minimum of the three curves 300A, 300B, 300C is a corresponding portion of the curve 300B; between the frequency points 404 and 406, the minimum of the three curves 300A, 300B, 300C is a corresponding portion of the curve 300A again; and from the frequency point 408 and above, the minimum of the three curves 300A, 300B, 300C is a corresponding portion of the curve 300C.

Figure 4B:
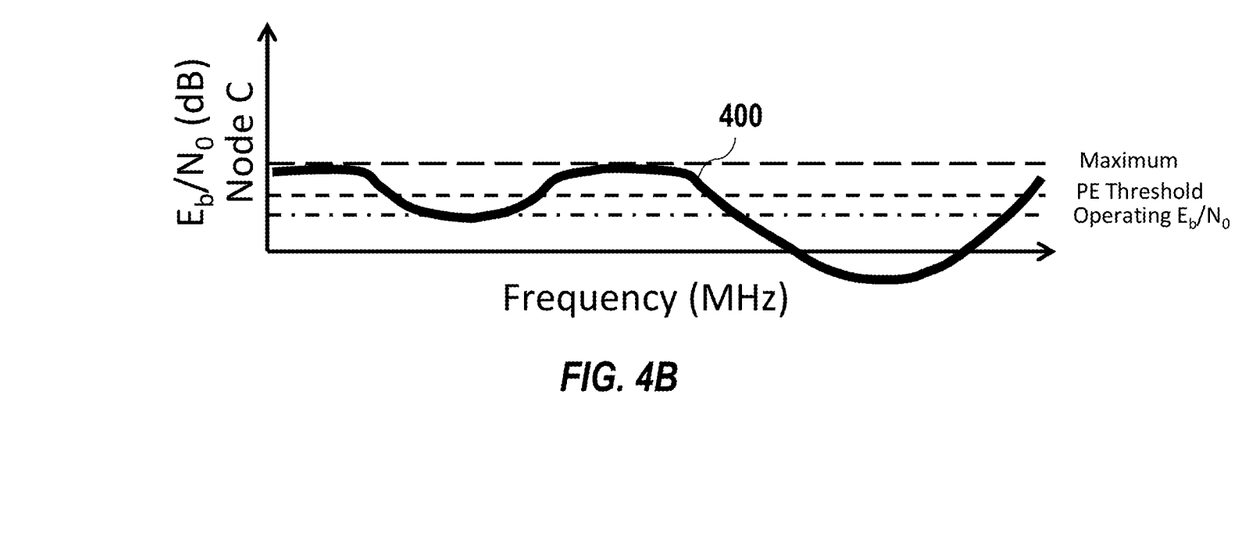
FIG. 4B illustrates the composite minimum curve generated based on the SNR curves of FIGS. 3A-3C and its relationships with a first threshold and a second threshold.

FIG. 4B illustrates the composite minimum curve 400 generated based on the SNR curves 300A, 300B, and 300C. Based on the composite minimum curve 400, the transmitter at node A determines whether an SNR rate of a current transmit frequency is above (1) a first threshold associated with a predetermined operating SNR, or (2) a second threshold associated with a maximum of the composite minimum curve. In some embodiments, the first threshold is a predetermined operating $E_b/N_0$ ratio (e.g., 6 dB). In some embodiments, the second threshold is a preferred frequency threshold (also referred to as the PE threshold), which may be defined as a predetermined amount (($\beta$ dB) below the maximum of the composite minimum curve (e.g., $\beta$=3 dB). This threshold is selected to ensure that low transmit power is maintained. Referring to FIG. 4B, the lower dash line represents the first threshold (e.g., the operating $E_b/N_0$ threshold), the upper dash line represents the maximum of the composite minimum curve, and the middle dash line represents the second threshold (i.e., the PE threshold), which is defined as a predetermined number (i.e., $\beta$) of dB below the maximum of the composite minimum curve.

Note, even though in FIGS. 4A and 4B, the PE threshold is shown to be higher than the operating $E_b/N_0$ threshold, this is not necessarily required. In some cases, the PE threshold may be lower than the operating $E_b/N_0$ threshold.

In some embodiments, for each of the receiver nodes B, C, D, if a current transmit frequency is above both thresholds, no frequency change is commanded. Otherwise, a frequency is selected from a subset of frequencies. Each frequency in the subset of frequencies corresponds to an SNR that is above both the first and the second thresholds.

Figure 5:
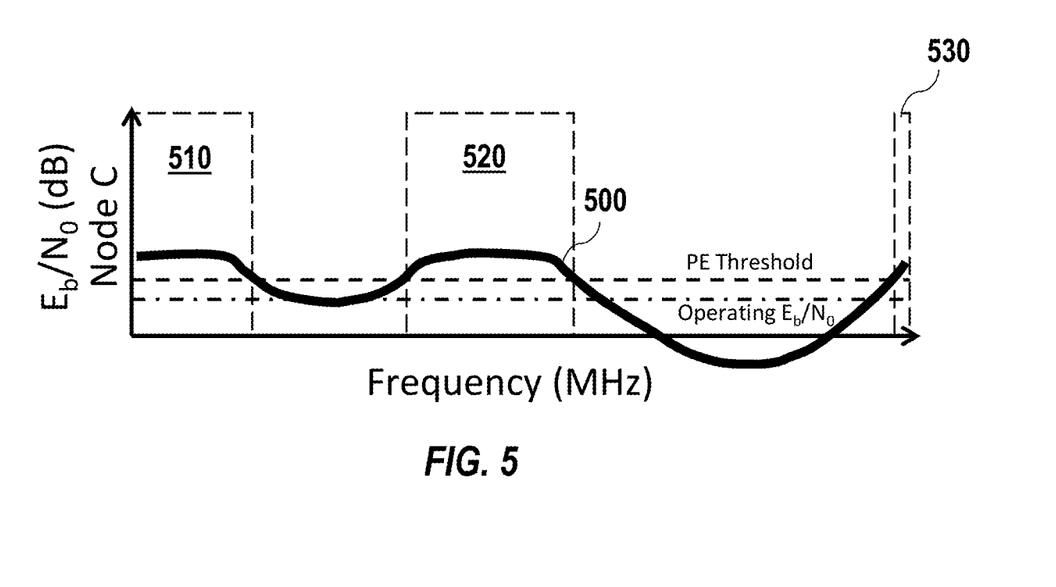
FIG. 5 illustrates a subset of frequencies in the band of operation being identified for selecting a new transmit frequency for transmitting data to any receiving node among nodes B, C, D.

In some embodiments, a subset of frequencies that satisfies both thresholds for each of the receiver nodes B, C, and D may be selected based on the composite minimum curve and the two thresholds. Referring to FIG. 5, since the composite minimum curve 500 represents the minimum SNR of the SNR curves of three receiver nodes B, C, and D, the portion of the composite minimum curve 500 that is above the two thresholds is the subsets 510, 520, 530 of the frequencies that satisfy both thresholds for each of the receiver nodes B, C, and D.

In some embodiments, for each of the receiver nodes B, C, and D, the transmitter determines whether the SNR of the current transmit frequency is above both of the thresholds. If the answer is yes, no frequency change is needed. Otherwise, a new frequency is selected from one of the subsets 510, 520, 530 of the frequencies. In yet some other embodiments, for each of the receiver nodes B, C, and D, the transmitter determines whether the current transmit frequency is within the subsets 510, 520, 530 of the frequencies. If the answer is yes, no frequency change is needed. Otherwise, a new frequency is selected from one of the subsets 510, 520, 530 of the frequencies.

Note, when data are transmitted via multiple traffic channels, these multiple traffic channels could have some overlap in the spectrum. If channels are spaced by $R_c$, then the amount of overlap may be based on the excess bandwidth of the signal. In some embodiments, the minimum spacing is a chip rate $R_c$, which is a number of chips per second transmitted in a spreading signal. For example, the transmit frequencies of nodes B, C, and D should have the minimum spacing (e.g., the chip rate $R_c$) between each other.

In some cases, two new transmit frequencies need to be selected. For example, when the current transmit frequencies for two of the nodes B, C, and D do not satisfy the two-threshold requirement, two new transmit frequencies need to be selected for the two nodes. Various methods may be implemented to select two transmit frequencies that are at least the minimum spacing apart and also satisfy the two thresholds requirement. In some embodiments, the transmitter randomly selects a first center frequency f1 from the subsets 510, 520, 530 of frequencies that is at least the minimum spacing (e.g., $R_c$ Hertz) apart from the highest frequency in the subsets 510, 520, 530. Next, the transmitter randomly selects a second center frequency f2 from the subsets 510, 520, 530. The second frequency f2 is at least the minimum spacing (e.g., $R_c$ Hertz) apart from the first frequency f1.

This method can be expanded for selecting more than two transmit frequencies. In some embodiments, when a third transmit frequency needs to be selected, the first two frequencies may first be temporarily assigned. For example, the first frequency may be temporarily set to a highest frequency (or one extremum frequency) in the frequency subset, and the second frequency may be temporarily set to the lowest frequency in the frequency subset. The third frequency may then be randomly set to any frequency from the frequency subsets that is at least $R_c$ Hertz away from the first and second frequencies. If there are no valid frequencies for the third frequency, then it may be impossible to find a set of frequencies within the frequency subsets that are spaced by at least $R_c$ Hertz. If the third frequency is valid, then the first frequency is changed to be randomly selected from any frequency from the frequency subsets that are at least $R_c$ Hertz away from the second and third frequencies. Finally, the second frequency is changed to be randomly selected from any frequency in the frequency subsets that are at least $R_c$ Hertz away from the first and the third frequencies.

The above-described process can be carried out for any number N of frequencies that must be assigned, where N>2. In a general case, the first N−1 frequencies are temporarily assigned to the highest or lowest frequency in the frequency subsets. In some embodiments, the temporary assignment of the first N−1 frequencies is performed in alternating fashion, and the currently being assigned frequency is at least $R_c$ Hertz away from all previous frequencies. Thereafter, the Nth frequency is randomly selected from the frequency subsets such that it is at least $R_c$ Hertz away from all the temporarily assigned N−1 frequencies. If a frequency cannot be found at any stage up to this point that is at least $R_c$ Hertz from the other frequencies, then it is impossible to find any set of frequencies from the frequency subsets that meet the condition. If the Nth frequency is successfully selected, then all of the N−1 temporary frequencies are in turn replaced with N−1 new frequencies that are randomly selected. In some embodiments, randomly selecting the N−1 new frequencies may be performed in a predetermined order, such as (but not limited to) starting from index N−1 moving back to index 1. For example, the (N−1)th new frequency is first randomly selected to be at least $R_c$ Hertz away from the Nth frequency, the (N−1)th frequency is replaced with the (N−1)th new frequency. Next, the (N−2)th new frequency is randomly selected to be at least $R_c$ Hertz away from the Nth frequency and the (N−1)th frequency, and the (N−2)th frequency is replaced with the (N−1)th new frequency. This process repeats until all the (N−1) temporarily assigned frequencies are replaced with the (N−1) new frequencies, respectively.

Note that the process for selecting N frequencies is a similar process that is used for two frequencies, except that in most of the cases, it is not necessary to place the first frequency temporarily at the highest frequency or need to be $R_c$ Hertz from the highest frequency when only two frequencies are to be selected. Also note, the alternating pattern of frequency placement for the general case or the order of reassigning the N−1 temporary frequencies is merely a preference, not a requirement.

The following discussion now refers to a number of methods and method acts that may be performed. Although the method acts may be discussed in a certain order or illustrated in a flow chart as occurring in a particular order, no particular ordering is required unless specifically stated or required because an act is dependent on another act being completed prior to the act being performed.

Figure 6:
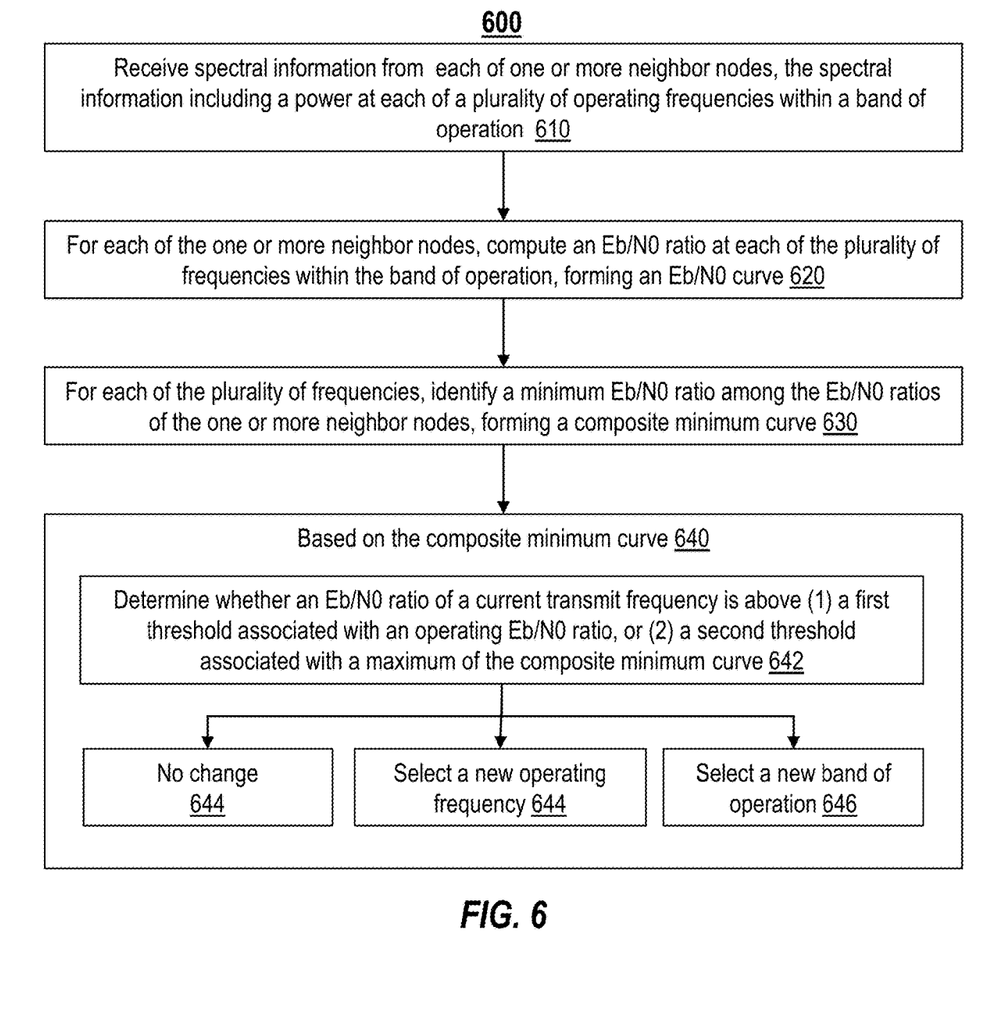
FIG. 6 illustrates a flowchart of an example of a method for selecting a transmit frequency for transmitting data to one or more neighbor receiver nodes in an FDD network system.

FIG. 6 illustrates a flowchart of an example of a method 600 for selecting a transmit frequency for transmitting data to one or more neighbor receiver nodes in an FDD network system. The method 600 may be implemented at a transmitter (e.g., transmitter node A of FIG. 1) in the network system. The method 600 includes receiving spectral information from each of the one or more neighbor receiver nodes (act 610). For example, the one or more neighbor receiver nodes may correspond to the neighbor receiver nodes B, C, and D in FIG. 1. The spectral information includes a power at each of a plurality of transmit frequencies within a current band of operation. The method 600 further includes, for each of the one or more neighbor receiver nodes, computing an SNR at each of the plurality of frequencies within the band of operation, forming an SNR curve (act 620). For example, the SNR curve may correspond to the SNR curves 300A, 300B, 300C of FIGS. 3A-3C. In some embodiments, the SNR curve is normalized to the maximum transmit power and the current desired rate of the transmitter.

The method 600 further includes for each of the plurality of frequencies, identifying a minimum SNR among SNRs of the one or more neighbor receiver nodes, forming a composite minimum curve 630. In some embodiments, the composite minimum curve is formed based on the normalized SNR curves of the one or more neighbor receiver nodes. For example, the composite minimum curve may correspond to the composite minimum curve 400 of FIG. 4B.

The method 600 further includes based on the composite minimum curve (act 640), determining whether an SNR of a current transmit frequency is above (1) a first threshold associated with an operating SNR, or (2) a second threshold associated with a maximum of the composite minimum curve (act 642). Based on the determination, it is then determined whether a new transmit frequency is to be selected.

In some embodiments, when the SNR of the current transmit frequency is greater than both the first threshold and the second threshold, no change is commanded (act 644). In some embodiments, when the SNR of the current transmit frequency is not greater than at least one of the first threshold or the second threshold, a new transmit frequency is selected in a subset of frequencies that have SNRs greater than both of the thresholds (act 644). In some embodiments, when no frequency in the current band of operation has an SNR that is greater than both of the thresholds, a new band of operation is commanded (act 646), swapping a current band of operation to the new band of operation.

Figure 7:
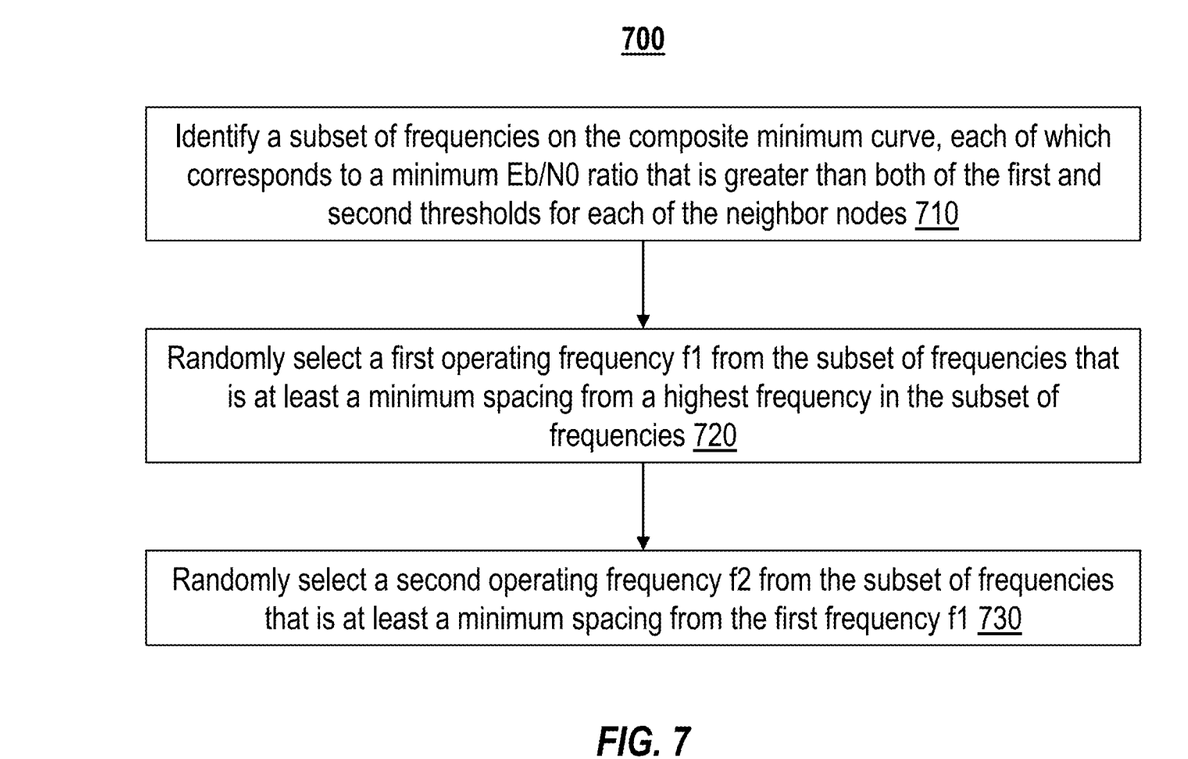
FIG. 7 illustrates a flowchart of an example of a method for selecting two frequencies for transmitting data to a subset of neighbor receiver nodes comprising one or more nodes in an FDD network system.

In some cases, more than one new transmit frequency needs to be selected. FIG. 7 illustrates a flowchart of an example of a method 700 for selecting two transmit frequencies. The method 700 includes identifying a subset of frequencies on a composite minimum curve generated by taking a minimum of each SNR curve at each frequency (act 710). For example, the composite minimum curve 400 may correspond to the composite minimum curve, and each of the SNR curves 300A, 300B, 300C may correspond to the SNR curve that is used to generate the composite minimum curve. In particular, each frequency in the subset of frequencies corresponds to a minimum SNR that is greater than both of the first and second thresholds.

The method 700 further includes randomly selecting a first transmit frequency f1 from the subset of frequencies that is at least a minimum spacing (e.g., $R_c$ Hertz) away from a highest frequency in the subset of frequencies (act 720). The method 700 further includes randomly selecting a second transmit frequency f2 from the subset of frequencies that is at least a minimum spacing (e.g., $R_c$ Hertz) apart from the first frequency f1 (act 730).

Figure 8:
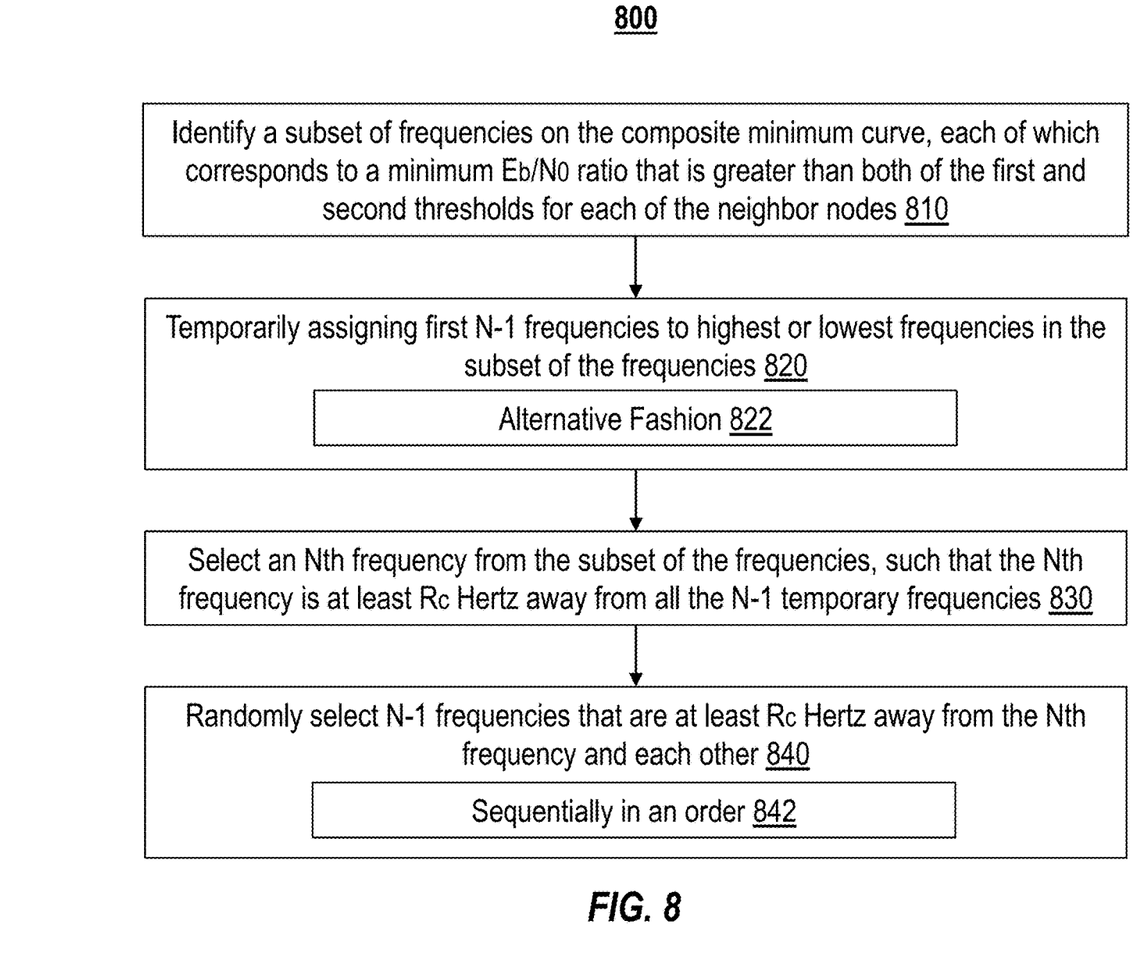
FIG. 8 illustrates a flowchart of an example of a method for selecting N (where N>2) frequencies for transmitting data to a subset of neighbor receiver nodes comprising one or more nodes in an FDD network system.

A similar process can also be implemented when more than two new transmit frequencies need to be selected. FIG. 8 illustrates a flowchart of an example of a method 800 for selecting N (where N>2) transmit frequencies. The method 800 includes identifying a subset of frequencies on the composite minimum curve, each of which corresponds to a minimum $E_b/N_0$ ratio that is greater than both the first and second threshold for each of the neighbor nodes (act 810). The method 800 also includes temporarily assigning first N−1 frequencies to highest or lowest frequencies (also referred to extremum frequencies) in the subset of the frequencies (act 820). In some embodiments, act 820 includes assigning the first N−1 frequencies in an alternate fashion (act 822). For example, the (N−1)th frequency is assigned as the highest frequency in the subset; the (N−1)th frequency is assigned as the lowest frequency in the subset; the (N−3)th frequency is assigned as a next highest frequency in the subset that is at least $R_c$ Hertz away from the (N−1)th frequency; and so on and so forth.

After the N−1 temporary frequencies are assigned, the method 800 also includes selecting an Nth frequency from the subset of the frequencies, such that the Nth frequency is at least $R_c$ Hertz from all the N−1 temporarily assigned frequencies (act 830). Finally, N−1 frequencies are then randomly selected to be at least Rc Hertz away from the Nth frequency and each other (act 840). In some embodiments, act 840 includes sequentially selecting the N−1 frequencies (act 842). For example, the (N−1)th frequency is first randomly selected that is Rc Hertz away from the Nth frequency; the (N−2)th frequency is then randomly selected that is Rc Hertz away from both the Nth frequency and the (N−1)th frequency; the (N−3)th frequency is then randomly selected that is Rc Hertz away from each of the Nth, (N−1)th, and (N−2)th frequencies; and so on and so forth, until all the N−1 frequencies are reselected.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transmitter in a frequency domain duplexing (FDD) network system configured to:
   receive spectral information from one or more neighbor receiver nodes, the spectral information including a power at each of a plurality of transmit frequencies within a current band of operation;
   for each of the one or more neighbor receiver nodes, compute an energy per bit ($E_b$) to noise power spectral density ($N_0$) ratio (SNR) at each of the plurality of transmit frequencies within the current band of operation, forming an SNR curve;
   for each of the plurality of transmit frequencies, identify minimum SNR values among SNR values on the SNR curves of the one or more neighbor receiver nodes, the minimum SNR values forming a composite minimum curve;
   based on the composite minimum curve, determine whether an SNR of a current transmit frequency is above (1) a first threshold associated with a predetermined operating SNR, or (2) a second threshold associated with a maximum of the composite minimum curve; and
   based on determining whether the SNR of the current transmit frequency is above the first threshold or the second threshold, determine whether a new transmit frequency is selected to replace the current transmit frequency.

2. The transmitter of claim 1, wherein:
   for each of the one or more neighbor receiver nodes, the SNR curve is normalized to generate a normalized SNR curve, and
   the composite minimum curve is formed based on each normalized SNR curve.

3. The transmitter of claim 1, wherein:
   the first threshold is the predetermined operating SNR; and
   the second threshold is a predetermined amount ($\beta$ dB) below the maximum of the composite minimum curve.

4. The transmitter of claim 1, wherein:
   when the SNR of the current transmit frequency is above both the first threshold and the second threshold, no frequency change is commanded.

5. The transmitter of claim 1, wherein when no transmit frequency within the current band of operation is above both the first threshold and the second threshold, the transmitter commands a band swap, swapping to a different band of operation.

6. The transmitter of claim 1, wherein when an SNR of a current transmit frequency is not above both the first threshold and the second threshold,
   identify a subset of frequencies within the current band of operation on the composite minimum curve, each of which has a minimum SNR greater than both of the first threshold and the second threshold, and
   select one or more new transmit frequencies within the subset of frequencies.

7. The transmitter of claim 6, wherein when more than one transmit frequency is to be selected, the more than one new transmit frequency of the one or more neighbor receiver nodes have a minimum spacing.

8. The transmitter of claim 7, wherein the minimum spacing is associated with a chip rate $R_c$ corresponding to a number of chips per second transmitted in a spreading signal.

9. The transmitter of claim 7, wherein when two frequencies are to be selected, the transmitter is configured to:
   randomly select a first frequency f1 from the subset of frequencies that is at least the minimum spacing apart from an extremum frequency in the subset of frequencies, and
   randomly select a second frequency f2 from the subset of frequencies that is at least the minimum spacing apart from the first frequency f1.

10. The transmitter of claim 7, wherein when three frequencies are to be selected,
    temporarily assigning a first frequency to one extremum frequency in the subset of frequencies;
    temporarily assigning a second frequency to another extremum frequency in the subset of frequencies;
    randomly selecting a third frequency that is at least a specified frequency spacing away from the first frequency and the second frequency;
    randomly selecting a new first frequency and a new second frequency that are at least the specified frequency spacing away from the third frequency and each other; and
    replacing the first frequency and the second frequency with the new first frequency and the new second frequency respectively.

11. The transmitter of claim 7, wherein when N frequencies are to be selected, where N>2,
    temporarily assigning N−1 frequencies to highest possible frequencies or lowest possible frequencies in the subset of frequencies, each of the N−1 frequencies is at least a specified frequency spacing away from each other;
    randomly selecting an Nth frequency that is at least the specified frequency spacing away from each of the N−1 frequencies;
    randomly selecting new N−1 frequencies that are at least the specified frequency spacing away from the Nth frequency and each other; and
    replacing each of the N−1 frequencies with the new N−1 frequencies, respectively,
    wherein when the new N−1 frequencies are randomly selected, each of the N−1 frequencies is selected and replaced before a next frequency is selected and replaced.

12. The transmitter of claim 10, wherein randomly selecting a new frequency and a new second frequency comprising:
    randomly selecting a new first frequency from the subset of the frequencies that is $R_c$ Hertz away from the second frequency and the third frequency; and
    randomly selecting a new second frequency from the subset of the frequencies that is $R_c$ Hertz away from the new first frequency and the third frequency.

13. The transmitter of claim 11, wherein assigning N−1 frequencies includes assigning each of the N−1 frequencies to a highest available frequency or a lowest available frequency in the subset of frequencies alternately.

14. The transmitter of claim 11, wherein randomly selecting new N−1 frequencies is based on a predetermined order.

15. A method for selecting a transmit frequency for transmitting data to one or more neighbor receiver nodes in a frequency domain duplexing (FDD) network system, the method comprising:

receiving spectral information from one or more neighbor receiver nodes, the spectral information including a power at each of a plurality of transmit frequencies within a current band of operation;

for each of the one or more neighbor receiver nodes, computing an energy per bit (Eb) to noise power spectral density (N0) ratio (SNR) at each of the plurality of transmit frequencies within the current band of operation, forming an SNR curve;

for each of the plurality of transmit frequencies, identifying minimum SNR values among SNR values on the SNR curves of the one or more neighbor receiver nodes, the minimum SNR values forming a composite minimum curve;

based on the composite minimum curve, determining whether an SNR of a current transmit frequency is above (1) a first threshold associated with a predetermined operating SNR, or (2) a second threshold associated with a maximum of the composite minimum curve; and based on determining whether the SNR of the current transmit frequency is above the first threshold or the second threshold, determining whether a new transmit frequency is selected to replace the current transmit frequency.

16. The method of claim 15, wherein:

the SNR curve for each of the one or more neighbor receiver nodes is normalized to generate a normalized SNR curve, the composite minimum curve is formed based on each normalized SNR curve, the first threshold is the predetermined operating SNR, and the second threshold is a predetermined amount ($\beta$ dB) below the maximum of the composite minimum curve.

17. The method of claim 15, wherein:

when no frequency within the current band is above both the first threshold and the second threshold, a band swap is commanded, swapping the current band of operation to a different band of operation; and when the SNR of the current transmit frequency is above both the first threshold and the second threshold, no frequency change is commanded.

18. The method of claim 15, wherein when an SNR of a current transmit frequency is not above at least one of the first threshold or the second threshold, identify a subset of frequencies within a current band of operation, each of which has an SNR greater than both the first threshold and the second threshold, and select one or more new transmit frequencies within the subset of frequencies as a new transmit frequency.

19. The method of claim 18, wherein:

the one or more new transmit frequencies of the one or more neighbor receiver nodes are at least a minimum spacing apart from each other, and the minimum spacing is associated with a chip rate $R_c$ that corresponds to a number of chips being transmitted per second.

20. A frequency domain duplexing (FDD) network system, comprising a plurality of nodes, each of which is configured to communicate with one or more neighbor receiver nodes, each of the plurality of nodes configured to:

receive spectral information from one or more neighbor receiver nodes, the spectral information including a power at each of a plurality of transmit frequencies within a current band of operation;

for each of the one or more neighbor receiver nodes, compute an energy per bit ($E_b$) to noise power spectral density ($N_0$) ratio (SNR) at each of the plurality of transmit frequencies within the current band of operation, forming an SNR curve;

for each of the plurality of transmit frequencies, identify minimum SNR values among SNR values on the SNR curves of the one or more neighbor receiver nodes, the minimum SNR values forming a composite minimum curve;

based on the composite minimum curve, determine whether an SNR of a current transmit frequency is above (1) a first threshold associated with a predetermined operating SNR, or (2) a second threshold associated with a maximum of the composite minimum curve; and based on determining whether the SNR of the current transmit frequency is above the first threshold or the second threshold, determine whether a new transmit frequency is selected to replace the current transmit frequency.

\* \* \* \* \*